June 19, 1951 C. L. INVIDIATO 2,557,604
SURGICAL BRACE AND PIVOTAL JOINT THEREFOR
Filed Nov. 22, 1949 2 Sheets-Sheet 1
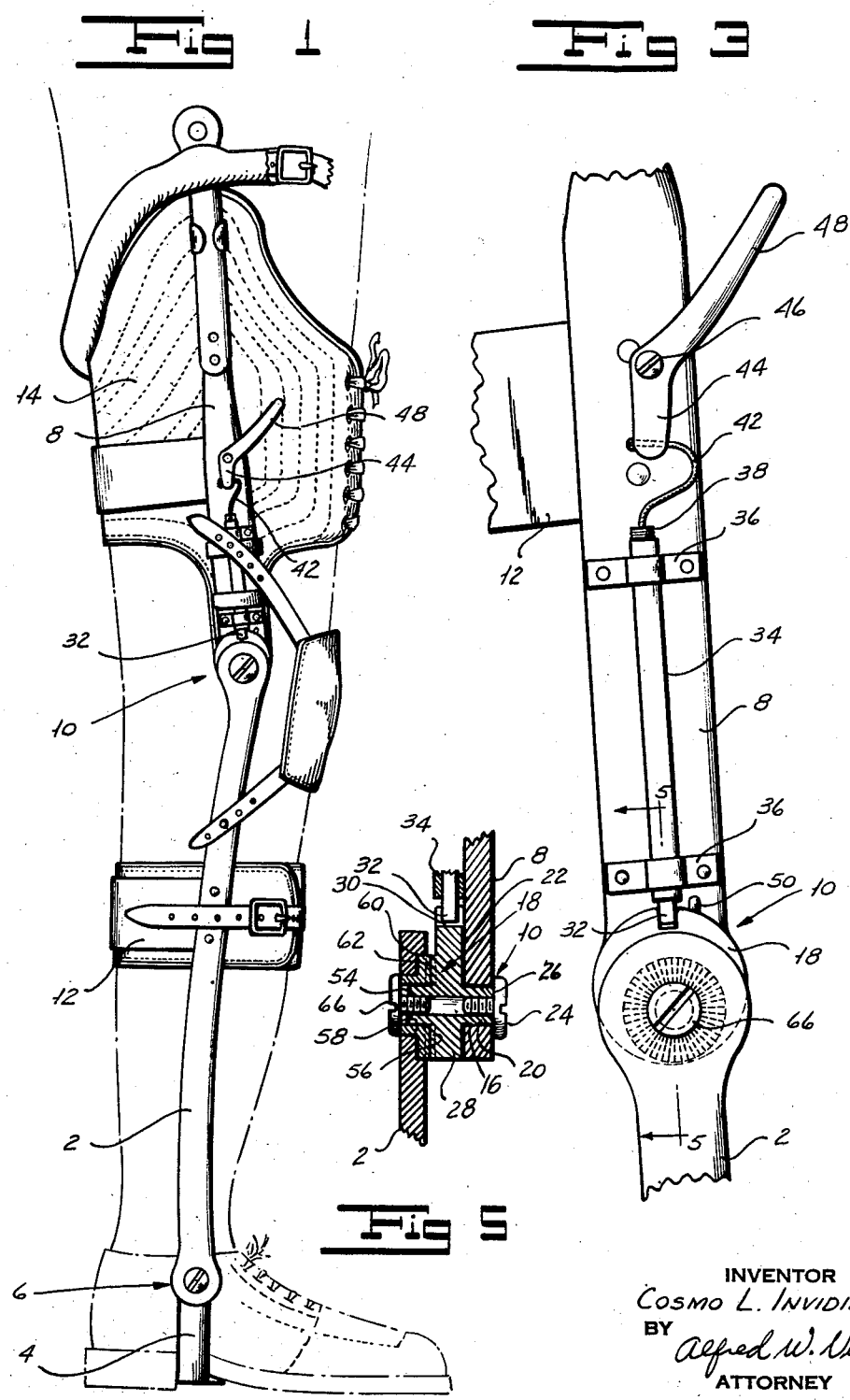
INVENTOR
Cosmo L. Invidiato
BY Alfred W. Vibber
ATTORNEY June 19, 1951     C. L. INVIDIATO     2,557,604
SURGICAL BRACE AND PIVOTAL JOINT THEREFOR
Filed Nov. 22, 1949     2 Sheets-Sheet 2
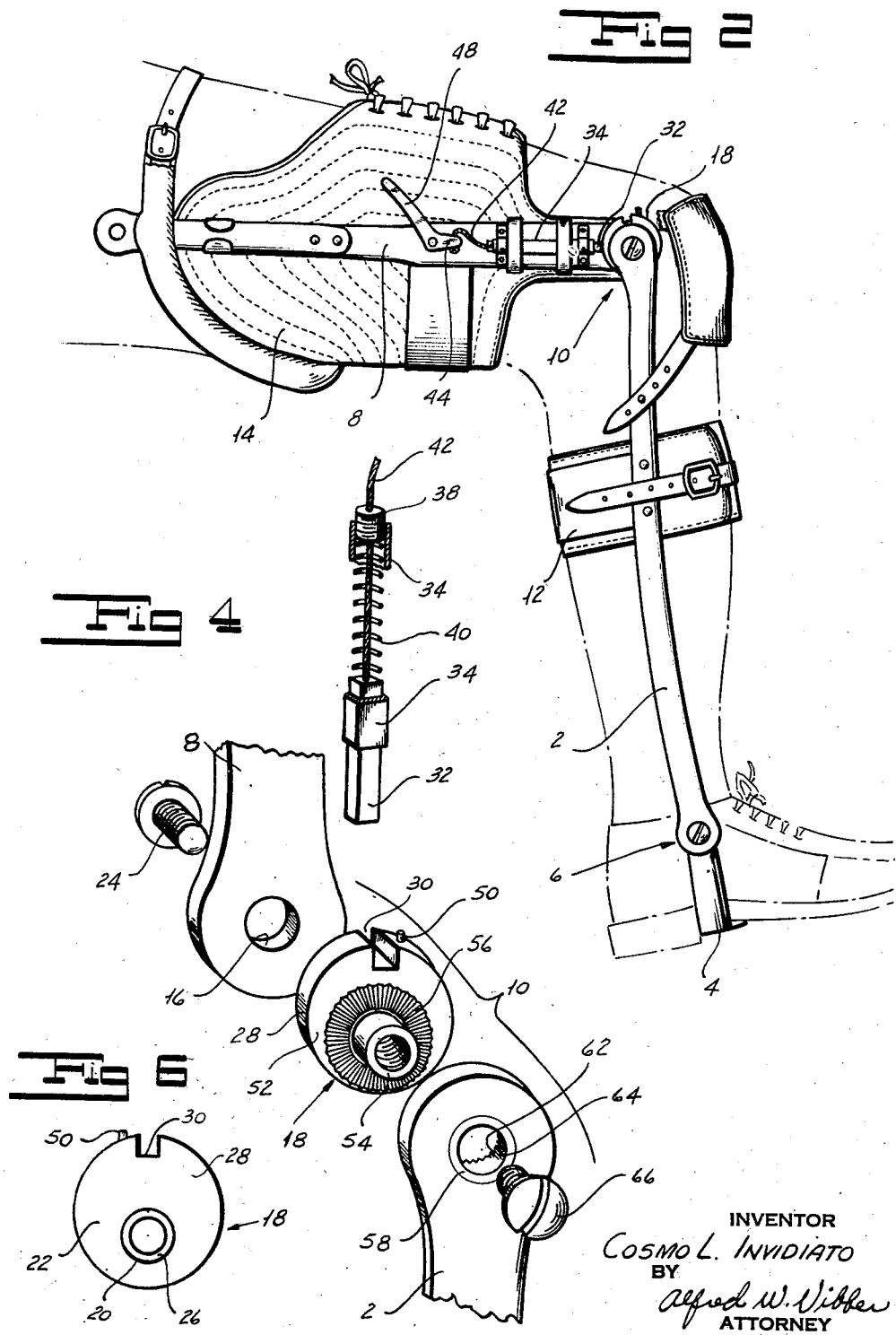
INVENTOR
Cosmo L. Invidiato
BY
Alfred W. Vibber
ATTORNEY Patented June 19, 1951

2,557,604

UNITED STATES PATENT OFFICE 2,557,604

SURGICAL BRACE AND PIVOTAL JOINT THEREFOR

Cosmo L. Invidiato, Paterson, N. J.

Application November 22, 1949, Serial No. 128,879

4 Claims. (Cl. 128—80)

This invention relates to a joint between two pivotally connected members, such joint allowing freedom of pivotal movement between the members over a selected angular range, and means to stop and lock the members in a selected angular relationship to each other.

More particularly the invention relates to a joint for a surgical brace, whereby the parts of the brace so joined have freedom of pivotal movement over a selected angular range and may be locked in selected adjustable angular relationship to each other; the invention further relates to a surgical brace incorporating such joint.

In the illustrative preferred embodiment the joint is shown incorporated in a surgical brace for the leg of a patient. Such brace is designed for patients suffering, for example, from arthritis so that the knee of the leg to which the brace is applied has limited angular freedom of motion. With such patients it is necessary to brace the knee in its outwardly extended position, as when the patient is walking, but it is also desired to allow the knee to bend as when the patient is sitting down. The joint of the invention is, therefore, designed to allow freedom of pivotal movement between the parts of the brace to which the joint is attached over a selected angular range, and to lock such members together at a suitably predetermined end point of such range. The joint is further designed so that the end point at which the members are locked may be easily and quickly adjusted.

It is therefore among the objects of the invention to provide a joint for use between two pivotally joined members, the joint including means to allow free pivoting of the members over a selected angular range and to lock the members against further pivotal movement at an adjustable end point of the range.

The invention has as a further object the provision of a joint of the above indicated type which is of rugged, simple, construction and which is easily adjusted to change the end point at which the members are locked together.

Yet another object of the invention resides in the provision of a surgical brace incorporating the above described joint.

These and further objects of the invention will be more readily apparent in the following description of a preferred embodiment of the joint of the invention and of the combination of such joint with a surgical brace, in which embodiment the invention finds perhaps its greatest advantages.

As above indicated, the joint of the invention is described herein, in its illustrative preferred embodiment, as being incorporated in a surgical brace, specifically a brace for a leg. It is to be understood, however, that the joint and the brace, within the broader aspects of the invention, may be such as to be applied to any part or parts of the body which have pivotal movement with respect to each other. Furthermore, within the broader scope of the invention, the joint is not restricted in its use to such incorporation in a surgical brace, being of advantage in other applications where two members are pivotally mounted on each other wherein freedom of pivotal movement over a selected range and stopping and locking of the members with respect to each other, at an end point of such range, are desired.

In the drawings accompanying the specification and forming a part thereof:

Fig. 1 is a view in side elevation of a surgical brace for a leg, such brace incorporating the joint of the invention, the leg and brace being shown in extended position;

Fig. 2 is a view in side elevation of such brace and leg, the leg being flexed;

Fig. 3 is an enlarged fragmentary view in side elevation of the brace in the vicinity of the joint of the invention;

Fig. 4 is an exploded view in perspective of the joint of the invention;

Fig. 5 is a view in cross section through such pivoted joint, the section being taken along the line 5—5 in Fig. 3; and Fig. 6 is a view in rear elevation of the locking member of the pivotal joint.

In Figs. 1 and 2 but one side of the brace of the invention is shown, there being a lower member 2 and an upper member 8 pivotally connected by the joint 10. The lower member 2 parallels the lower part of the leg of the patient and the upper member 8 parallels the thigh portion of such leg. It is to be understood that similar upper and lower brace members are disposed on the other side of the patient's leg in a similar relationship, in the brace described a joint coaxial with joint 10 being employed. In such brace, however, the joint at the other side of the brace is of a simple pivot type, no locking means being employed.

The brace is provided with a lower, stirrup-like, part 4 which extends, as shown, beneath the instep of the shoe of the patient. The upstanding side arms of portion 4 are pivotally connected to the bottom ends of the lower brace members, one such connection between part 4 and the lower end of part 2 being shown at 6. The brace is further provided with a customary binding 12 for the calf of the patient, and with a conventional binding 14 for the lower thigh of the patient.

Pivotal joint 10 between members 2 and 8 is more particularly shown in Figs. 3–6, inclusive. As shown in Fig. 4, the bottom end of upper brace member 8 is provided with a bore 16 therethrough extending at right angles to the broad surfaces of such member. Pivotally mounted upon member 8 is the intermediate lock providing member 18, the flat surface 22 thereof being mounted in contact with the broad surface of member 8 shown facing the reader in Fig. 4. Member 18 is provided, as shown in Fig. 6, eccentrically thereof with a boss 20 extending at right angles to the surface 22, boss 20 having an external diameter such as to fit snugly within the bore 16. Member 18 is thus freely pivotable upon member 8, and is retained thereon by means of the screw 24 which is threaded into the internally threaded boss 20 of member 18. Boss 20 is of such length that its outer surface 26 lies substantially flush with the right-hand surface of member 8, as the joint is shown in Fig. 5.

The periphery of member 18 is circular cylindrical in shape. Diametrically opposed from the boss 20 and radially directed with respect to member 18 is the radial slot 30 extending inwardly from the periphery of the member 18. Slot 30 is designed to receive the nose of the selectively retractible stop pin member 32 which is slidably mounted upon member 8 in the manner shown in Fig. 3. The side of slot 30 at the right in Fig. 4 may be considered as a stop shoulder preventing further movement toward an extended position of the parts 2 and 8 of the brace when such shoulder is engaged by pin 32.

A hollow elongated casing 34 is secured to the outer face of member 8 by means of the strap members 36 attached to member 8. Retractible pin 32 slides vertically within the lower end of casing 34. The upper end of such casing is internally threaded, there being an adjustable abutment 38 threadedly received within the upper end of such casing. Disposed between the upper end of pin 32 and the lower end of abutment 38 is the compression coil spring 40, which is disposed within casing 34. A flexible cable 42 is secured at its lower end to the upper end of the pin 32. Cable 42 extends to the outer end of the short arm 44 of the pin operating bell-crank lever as shown more clearly in Fig. 3. The bell-crank lever is pivotally secured to the outer face of member 8 by means of the pivot pin 46. The longer operating arm of the bell-crank lever is designated 48.

It will be apparent that by turning the bell crank lever clockwise, as it is shown in Fig. 3, the slack in the cable 42 may be taken up, after which the pin 32 is retracted from the slot 30, thereby allowing member 18 to rotate freely clockwise (as it is shown in Fig. 4) with respect to pin 32, the nose of the pin when the latter is released riding upon the peripheral surface 28 of member 18 at the left of the slot member 18 is shown in Fig. 4. A generally radially directed pin 50 providing a stop shoulder is provided on the periphery of member 18 somewhat to the right of slot 30, as the device is shown in Fig. 4, to prevent member 18 from turning appreciably counter-clockwise past the point at which pin 32 would engage in slot 30, even though pin 32 is retracted from member 18.

The broad surface of member 18 opposite from the above described surface 22 is designated 52. Rising from surface 52 coaxial with boss 20, and of the same diameter of such boss, is the oppositely directed boss 54. Boss 54 is, as shown, hollow and internally threaded. Surrounding boss 54 is a raised circular portion 56 which is radially serrated.

Means are provided on member 2 to cooperate with the serrated portion 56 on part 18 whereby selectively to hold part 18 in a predetermined angular relationship with respect to member 2. Such last described means takes the form of a member 58 which is fixedly secured to as by being drivingly inserted in the end of member 2 at the joint in confronting relationship to the part 56 of member 18. As shown more clearly in Fig. 5, member 58 is provided with a flange 60, such flange fitting within a counter-bore portion in member 2. The face of member 58 confronting part 56 is of a similar diameter and is similarly radially serrated, whereby the parts 18 and 58 may be selectively locked in predetermined angular relationship. The stem portion of part 58, which fits within the hole in member 2, as shown more clearly in Fig. 5, is provided with a hole 64 therethrough, such hole snugly receiving the boss 54 as shown. Member 18 is held against part 58, so that the respective serrated portions thereof interengage, by means of the screw 66 which is threadedly received within the threaded opening in boss 54.

It is believed that, from the above, the manner of operation of the joint of the invention and the mode of its adjustment will be apparent. However, such matters will be briefly summarized here for the sake of clarity. When the parts are assembled as shown in Fig. 5, parts 18 and 58 are locked with respect to member 2 and move with it as such member is moved angularly with respect to member 8, pivotal movement between parts 2 and 8 taking place between the bore 16 and the boss 20, assuming that the member 18 is in such angular position that pin 32 is not engaged in slot 30. When pivotal movement between members 2 and 8 is continued to the end of the range to which the joint is set, the nose of pin 32 drops into slot 30 on member 18, thereby preventing further angular movement between parts 2 and 8. This is the relationship of the parts in the brace as it is shown in Fig. 1, and is the position at which the brace will be set by the attending physician whereby it approximates the maximum extension possible in the knee of the afflicted leg.

If it is desired to change such locked angular relationship of parts 2 and 8, it is necessary only to loosen screw 66, located on the exterior of the brace, to an amount sufficient to allow the peaks of the serrations on parts 56 and 58 to clear each other. The member 18 is then turned to a position such that parts 2 and 8 will have the desired angular relationship to each other when pin 32 is engaged in slot 30. Thereupon screw 66 is tightened to lock member 18 in such angular relationship with respect to member 2. The leg will thus be in the desired angular extension when the joint is locked.

When the patient desires to bend his leg, as when he sits down, it is necessary only for him to rotate the bell-crank lever clockwise, as it is shown in Fig. 3, to retract pin 32 from the slot 30, whereby the lower part of the brace may be turned to a position relative to the upper part thereof such as shown in Fig. 2.

The joint of the invention is simple, rugged and easily adjusted. Furthermore, it is of such construction that it may readily be adjusted as to the terminal angular position at which it locks while it is worn, thus not necessitating repeated removals and reapplications of the brace from the afflicted member of the body.

Whereas for purposes of illustration I have shown and described the pivotal joint of the invention and the surgical brace incorporating such joint in preferred embodiments thereof, it is to be understood that the invention, as above indicated, may be markedly varied as to construction and as to its manner of application. The invention is, therefore, defined by the scope of the claims appended hereto.

I claim as new the following:

1. A surgical brace comprising a first brace member adapted to be secured to a first part of a jointed member of the human body, a second brace member adapted to be secured to a second part of the jointed member of the human body, and a pivotal joint between the first and second members of the brace, said pivotal joint comprising a first element connected to the first member adjacent one end thereof, said first element having an engaging face portion lying parallel to the inner face of the first member, a second, locking, element in the form of a generally cylindrical disc interposed between the first and second members and pivotally connected to the second member, said second, locking, element having an engaging face on a first side face thereof, said last named engaging face being complementary to and in contact with the engaging face on the first element, inter-engaging means on the two such engaging faces to hold them in a selected angular position, releasable means to hold the said engaging faces in contact and to affix the second, locking, element to the first brace member, a locking pin slidably mounted on the second member of the brace in confronting relation with the periphery of the locking member, means urging said pin into contact with the periphery of the locking member, one of the elements of the group consisting of the periphery of the locking member and the locking pin having a slot in the surface thereof confronting the other member of the group and the other member having a projection adapted to fit within the slot, and means to retract the pin from the slot and the periphery of the locking member.

2. A surgical brace comprising a first brace member adapted to be secured to a first part of a jointed member of the human body, a second brace member adapted to be secured to a second part of the jointed member of the human body, and a pivotal joint between the first and second members of the brace, said pivotal connection comprising a first element on the first member adjacent one end thereof, said first element having a face portion lying parallel to the inner face of the first member, said face being serrated, a second, locking, element in the form of a disc interposed between the first and second members, said second, locking, element having a serrated face on a first side face thereof, said last named serrated face being complementary to and in contact with the serrated face on the first element, releasable means to hold the said serrated faces in contact and to affix the second, locking, element to the first brace member, the locking element having a radial slot therein from the periphery thereof, means on the brace for pivotally attaching the second member of the brace to the locking element so that the second face of the locking member lies parallel to and generally in contact with the second member of the brace, a locking pin slidably mounted on the second member of the brace in confronting relation with the slotted periphery of the locking member, means on the brace urging said pin into contact with the periphery of the locking member and into the slot therein when the latter confronts the pin, and means on the brace to retract the pin from the slot and the periphery of the locking member.

3. A surgical brace comprising a first elongated brace member adapted to be secured to a first part of a jointed member of the human body, a second elongated brace member adapted to be secured to a second part of the jointed member of the human body, and a pivotal joint between the first and second members of the brace, the first member having a bore through it extending generally normal to the length of such first member and positioned adjacent the end thereof at the joint, the second member having a bore through it extending generally normal to the length of such second member and positioned adjacent the end thereof at the joint, said pivotal connection comprising a first element in the form of a disc having a boss on one face thereof, the boss having an axial bore therein, the boss fitting within the bore in the first member, said first element being fixedly secured to the first member, the front face of the disc of the first element lying outwardly of and parallel to the inner face of the first member, said front face of the disc being radially serrated, a second, locking, element in the form of a generally cylindrical disc interposed between the first and second brace members, said second, locking, element having a round, radially serrated, face on a first side face thereof, said last named round, serrated, face being complementary to and in contact with serrated face of the first element, releasable means to hold the said serrated faces in contact and to affix the second, locking, element to the first brace member, said last named means comprising a first boss on the first, serrated, side face on the second, locking, element, said boss projecting from and disposed normal to said first face of the second element, said first boss fitting accurately within the bore in the boss of the first element, the first boss on the second, locking, element having a threaded bore therein, and a headed stud screwed into said last named bore, the locking element having a radial slot therein from the periphery thereof, means for pivotally attaching the second member of the brace to the locking member so that the second face of the locking member lies parallel to and generally in contact with the second member of the brace, said last named means comprising a second boss on the second side face of the second, locking, element, said second boss projecting from and disposed normal to said second face, said second boss accurately fitting within the bore in the end of the second brace member, and means securing the second, locking, element to the second member, a locking pin slidably mounted on the second member of the brace in confronting relation with the slotted periphery of the locking member, means on the brace constantly urging said pin into contact with the periphery of the locking member and into the slot therein when the latter confronts the pin, and means on the brace to retract the pin from the slot and the periphery of the locking member.

4. A surgical brace comprising a first elongated brace member adapted to be secured to a first part of a jointed member of the human body, a second elongated brace member adapted to be secured to a second part of the jointed member of the human body, and a pivotal joint between the first and second members of the brace, the first member having a bore through it and a counterbore thereabout extending generally normal to the length of such first member and positioned adjacent the end thereof at the joint, the second member having a bore through it extending generally normal to the length of such second member and positioned adjacent the end thereof at the joint, said pivotal connection comprising a first element in the form of a disc having a boss on one face thereof, the boss having an axial bore therein, the boss fitting within the bore in the first member and the disc fitting with the rear portion thereof within the counterbore, said first element being fixedly secured to the first member, the front face of the disc of the first element lying outwardly of and parallel to the inner face of the first member, said front face of the disc being radially serrated, a second, locking, element in the form of a generally cylindrical disc interposed between the first and second brace members, said second, locking, element having a round, radially serrated, face on a first side face thereof, said last named round, serrated, face being complementary to and in contact with serrated face of the first element, releasable means to hold the said serrated faces in contact and to affix the second, locking, element to the first brace member, said last named means comprising a first boss on the first, serrated, side face on the second, locking, element, said boss projecting from and disposed normal to said first face of the second element, said first boss fitting accurately within the bore in the boss of the first element, the first boss on the second, locking, element having a threaded bore therein, and a headed stud screwed into said last named bore, the locking element having a radial slot therein from the periphery thereof, means for pivotally attaching the second member of the brace to the locking member so that the second face of the locking member lies parallel to and generally in contact with the second member of the brace, said last named means comprising a second boss on the second side face of the second, locking, element, said second boss projecting from and disposed normal to said second face, said second boss accurately fitting within the bore in the end of the second brace member, the second boss on the second, locking, member having a threaded bore therein, and a headed stud screwed into said last named bore, a locking pin slidably mounted on the second member of the brace in confronting relation with the slotted periphery of the locking member, means on the brace constantly urging said pin into contact with the periphery of the locking member and into the slot therein when the latter confronts the pin, and means on the brace to retract the pin from the slot and the periphery of the locking member.

COSMO L. INVIDIATO.

REFERENCES CITED

The following references are of record in the file of this patent:

UNITED STATES PATENTS

| Number | Name | Date |
|---|---|---|
| 62,731 | Carleton | Mar. 12, 1867 |
| 437,650 | Huntington | Sept. 30, 1890 |
| 1,418,283 | Cameron | June 6, 1922 |